United States Patent [19]

Funke

[11] 4,067,414
[45] Jan. 10, 1978

[54] LUBRICANT FITTING

[76] Inventor: Ludwig F. Funke, 7200 Newburgh Road, Evansville, Ind. 47715

[21] Appl. No.: 715,457

[22] Filed: Aug. 18, 1976

[51] Int. Cl.² .............................................. F16N 23/00
[52] U.S. Cl. .................................... 184/105 B; 137/846
[58] Field of Search .................... 184/105 B; 137/846, 137/847, 848, 849, 850; 285/238

[56] References Cited

U.S. PATENT DOCUMENTS

| 2,546,672 | 3/1951 | Le Clair | 184/105 B |
| 2,594,320 | 4/1952 | Le Clair | 184/105 B X |
| 2,856,025 | 10/1958 | Whited et al. | 184/105 B |
| 2,922,435 | 1/1960 | Edwards | 184/105 B X |
| 3,116,747 | 1/1964 | Cowles et al. | 184/105 B X |
| 3,148,696 | 9/1964 | Hoke | 137/847 X |
| 3,159,176 | 12/1964 | Russell et al. | 137/846 X |
| 3,295,870 | 1/1967 | Seablom | 285/238 X |
| 3,542,155 | 11/1970 | Kern et al. | 184/105 B |

Primary Examiner—David H. Brown
Attorney, Agent, or Firm—Warren D. Flackbert

[57] ABSTRACT

An integrally molded plastic lubricant fitting which has the check valve at the outlet of the fitting instead of at the inlet, and where hydrostatic pressure from the lubricant within the body of the fitting maintains the fitting in an operative position. The latter is further assured through the provision of circumferential ribs on the outer surface of the body of the fitting, such coacting with the inner surface of a predrilled fitting hole in a positive manner.

3 Claims, 4 Drawing Figures

LUBRICANT FITTING

The usage of lubrication fittings is widespread, serving a large variety of mechanical applications. The production of the presently or prior used lubricant or grease fitting typically required metal drilling, cold heading and forming, as well as the need for additional parts, i.e. a steel ball and a steel spring. With the aforesaid type of lubricant fitting, manufacturing procedures are somewhat complex, resulting in time and money expenditures. Additionally, in that several items are involved, the possibility of use failure is multiplied.

The invention overcomes the disadvantages of the noted prior structures in presenting an integrally molded fitting, i.e. one which does not require additional parts and/or specialized assembly procedures. The invention is broadly defined as a fitting having an inlet for receiving a lubricant gun, a longitudinal passageway extending to an outlet, a check valve disposed at the outlet, and a circumferentially ribbed outer wall surrounding the longitudinal passageway.

With the preceding arrangement, the hydrostatic pressure from the lubricant gun balloons the body of the fitting outwardly against the inner surface of the predrilled hole into which the fitting is pressed fit. The pressure at the inlet of the fitting occurs first and is always greater than the back pressure beyond the check valve. Thus, any back pressure which may seep into a void of the pressed fit, tending to collapse the fitting from its operative position, is less than the internal pressure ballooning the fitting, and, therefore, positive placement is assured.

As a further positioning feature, a multitude of circumferential ribs are provided on the body of the fitting, such engaging the roughened inner surface of the predrilled hole into which the fitting is placed. Thus, when the hydrostatic pressure on the inside of the fitting balloons or expands the body of the fitting, the aforesaid ribs are forced against the roughened inner surface of the hole.

It will be understood that the invention presents a low cost, rust free, more reliable lubricant fitting than those in use heretofore. The invention achieves positive positioning, manufacturing economies, and simplicity in use.

A better understanding of the present invention will become more apparent from the following description, taken in conjunction with the accompanying drawing, wherein FIG. 1 is a perspective view of a lubricant fitting in accordance with the teachings of the present invention;

Figure 1:
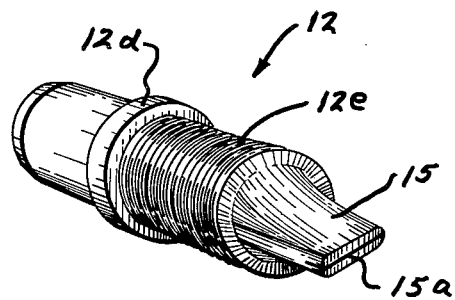
Figure 2:
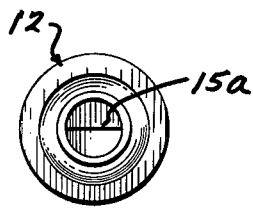
FIG. 2 is a view in end elevation of the instant lubricant fitting, looking from left to right in FIG. 1.
Figure 3:
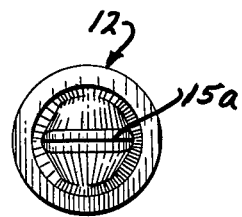
FIG. 3 is another view in vertical section of the lubricant fitting, in this instance looking from right to left in FIG. 1; and, FIG. 4 is a view in vertical section showing the lubricant fitting of the invention in a position of use.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
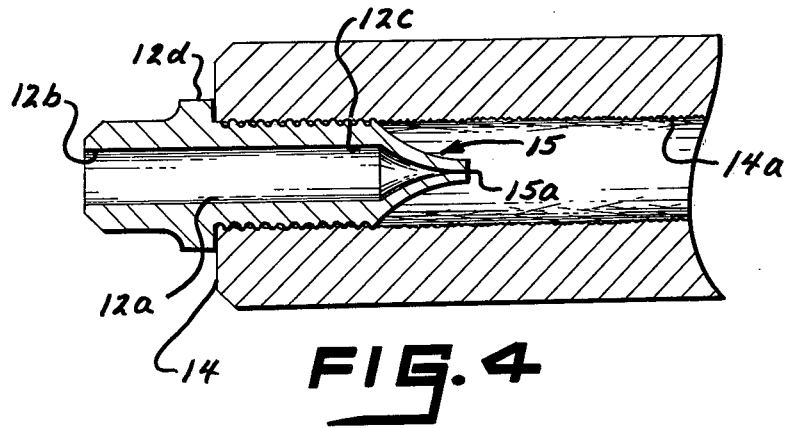

Referring now to the figures, the lubricant fitting of the invention is defined by a body 12 having a longitudinal opening 12a extending from inlet 12b to outlet 12c of the fitting. The body 12 includes a peripheral flange 12d, one surface of which bears against a wall 14 having a predrilled hole 14a into which the fitting is to be positioned (see FIG. 4).

The fitting further includes a check valve 15 at the exit 12c, typically assuming a known duckbill configuration in order to provide large interior surfaces between a slitted mouth 15a thereof. The check valve 15 permits passage of a lubricant from outlet 12c of the fitting, but, at the same time, prevents return of the lubricant into the fitting.

The body 12 of the fitting further includes circumferential raised ribs 12e on the outer surface thereof, such cooperating, in a manner to be discussed herebelow, with the roughened interior surface of the predrilled hole 14a. In other words, added gripping action is provided for even more positive placement.

Importantly, the fitting of the invention is unitary, i.e. requires no additional parts. The fitting is molded from a high impact, yet resilient, plastic, such as resins of the IONOMER, ACETAL or ABS families, for example. In veiw thereof, the finished fitting is rust free, and affords a low production cost.

In use, the fitting is inserted into the predrilled hole 14a in a pressed fit relationship. As evident, the body 12 frictionally bears against the roughened inner surface of the hole 14a. With the use of a conventional lubricant gun, the hydrostatic lubricant pressure tends to balloon or enlarge the wall of the body 12 outwardly against the roughened inner surface of the hole 14a.

In that pressure on the inlet 12b of the fitting occurs first and is greater than the back pressure beyond the check valve 15, any back pressure seeping into a void or voids at the line of pressed fit between the body 12 and the predrilled hole 14a, which would tend to collapse the fitting, is less than the internal pressure enlarging or ballooning the fitting. Positive placement is therefore achieved.

Additional gripping is achieved by action between the ribs 12e and the roughened inner wall of the predrilled hole 14a. In other words, the combination of the hydrostatic lubricant pressure and the coaction of the ribs 12e and the inner wall serve to create optimum positioning force.

From the preceding, it should be apparent that the invention provides an integral molded plastic lubricant fitting which is simply and effectively positioned for use. Important manufacturing and operational advantages are presented. It should be understood, however, that the described lubricant fitting is susceptible to various changes within the spirit of the invention. As a matter of example, proportioning may be varied to accommodate particular installation requirements, and the type of check valve modified from the depicted duckbill. Thus, the preceding should be considered illustrative, and not as limiting the scope of the following claims:

I claim:

1. A unitary semi-rigid lubricant fitting for a drilled hole comprising a body having a longitudinal passageway therethrough, said passageway defined by an inlet end and an outlet end, a check valve disposed at said outlet end, and said inlet end adapted to extend from said drilled hole when fitted therein and further adapted to receive pressurized lubricant from a lubricant gun, whereby the hydrostatic pressure of lubricant injected from said lubricant gun balloons said body into a gripping relationship within said drilled hole, locking said fitting against outward movement from said drilled hole.

2. The unitary lubricant fitting of claim 1 where said body has a ribbed outer surface.

3. The unitary lubricant fitting of claim 1 where said check valve has a duckbill configuration.

* * * * *